United States Patent
Chou

(10) Patent No.: US 10,897,635 B2
(45) Date of Patent: Jan. 19, 2021

(54) MEMORY COMPRESSION SYSTEMS AND METHODS

(71) Applicant: Apple Inc., Cupertino, CA (US)

(72) Inventor: Jim C. Chou, San Jose, CA (US)

(73) Assignee: Apple Inc., Cupertino, CA (US)

(*) Notice: Subject to any disclaimer, the term of this patent is extended or adjusted under 35 U.S.C. 154(b) by 71 days.

(21) Appl. No.: 15/407,116

(22) Filed: Jan. 16, 2017

(65) Prior Publication Data
US 2018/0070095 A1 Mar. 8, 2018

Related U.S. Application Data

(60) Provisional application No. 62/384,013, filed on Sep. 6, 2016.

(51) Int. Cl.
| H04N 19/63 | (2014.01) |
| H04N 19/91 | (2014.01) |
| H04N 19/119 | (2014.01) |
| H04N 19/137 | (2014.01) |
| H04N 19/174 | (2014.01) |

(52) U.S. Cl.
CPC .......... *H04N 19/91* (2014.11); *H04N 19/119* (2014.11); *H04N 19/137* (2014.11); *H04N 19/174* (2014.11); *H04N 19/63* (2014.11)

(58) Field of Classification Search
CPC .... H04N 19/91; H04N 19/119; H04N 19/137; H04N 19/174; H04N 19/63
USPC ............................................. 375/240.19
See application file for complete search history.

(56) References Cited

U.S. PATENT DOCUMENTS

| 6,272,180 | B1 | 8/2001 | Lei |
| 6,904,175 | B2 | 6/2005 | Chao et al. |
| 7,440,624 | B2 | 10/2008 | Kodama et al. |
| 8,116,579 | B2 | 2/2012 | Fenney et al. |
| 8,565,298 | B2 | 10/2013 | Schwartz |
| 9,153,212 | B2 | 10/2015 | Tripathi et al. |
| 2010/0014590 | A1* | 1/2010 | Smith ............ H04N 19/176 375/240.19 |
| 2014/0161367 | A1* | 6/2014 | Ridenour ........ H04N 19/115 382/233 |
| 2014/0286584 | A1* | 9/2014 | Alfonso .......... H04N 19/176 382/233 |
| 2014/0292787 | A1* | 10/2014 | Tripathi ......... G09G 5/395 345/531 |
| 2014/0294089 | A1* | 10/2014 | MacInnis ........ H04N 19/63 375/240.19 |

* cited by examiner

*Primary Examiner* — Ayman A Abaza
(74) *Attorney, Agent, or Firm* — Fletcher Yoder, P.C.

(57) ABSTRACT

A display control is configured to detect a first condition related to an image frame from source image data. The display control is also configured to compress the image frame iteratively on portions of the image frame to generate a compressed frame. The display control is configured to compress the image frame iteratively when the first condition is detected. Additionally, display control is configured to determine whether to transmit the compressed frame to memory.

20 Claims, 10 Drawing Sheets

MEMORY COMPRESSION SYSTEMS AND METHODS

CROSS-REFERENCE TO RELATED APPLICATIONS

This application is a Non-Provisional application claiming priority to U.S. Provisional Patent Application No. 62/384,013, entitled "MEMORY COMPRESSION SYSTEMS AND METHODS," filed Sep. 6, 2016, which is herein incorporated by reference.

BACKGROUND

The present disclosure relates generally to electronic displays and, more particularly, to the compression of data and use thereof of in rendering images on electronic displays. This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices are coupled to or include electronic displays to display images that provide visual representations of information. Such electronic devices may include computers, mobile phones, portable media devices, tablets, televisions, watches, virtual-reality headsets, and vehicle dashboards, among many others. The display may provide an interface (e.g., a visual and/or a visual and tactile interface) that may allow for user interaction with the electronic device.

During operation, the images displayed on the electronic display may be relatively dynamic (e.g., frequently changing) or relatively static (e.g., change infrequently). For example, a home screen, a representation of a page of a book or a website, a picture being displayed, or the like may require relatively few (or even no) changes in the generated image to be displayed for a period of time (e.g., for multiple generated image frames). However, if the electronic device and/or the display generate images in a similar manner, regardless of the static or dynamic properties of the image to be generated (e.g., whether the image is to change from one frame to the next), excess processing, power usage, and the like may be unnecessarily exerted.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to devices and methods for increasing power conservation and/or reducing processing in an electronic display. In one embodiment, a display pipe may generate one or more frames of images and/or video sequences to be output for display on a display. However, situations occur in which content of the successive frames do not change. In these situations, use of previously generated frames in place of generating a new frame may save both power in the device as well as processing bandwidth.

Thus, while it may be beneficial to utilize a previously generated frame when content of the frame is not changing, storage of the previously generated frame may impose unwanted overhead in the system. Accordingly, the display pipe include a compressor that compresses a generated frame and writes back the compressed frame to a compressed image buffer. The data in the compressed image buffer may be used as an alternative source for an image frame data in place of other source data for generating images for display on the display. The compressed image buffer data (e.g., the compressed image) may be decompressed via a decompressor to generate an image frame to be displayed by the display.

The compression of the generated frame may be undertaken in such a manner that the compression is lossless. This may be accomplished, for example, by dividing the image data of the generated image frame into subsets corresponding to a predetermined number pixels of the image data. The subsets may transformed via a wavelet transform and subsequently encoded via an entropy coder. The wavelet transform may be a discrete wavelet transform that utilizes Haar coefficients, such that one iteration of the wavelet transform on a subsets input block will yield a set number of low frequency coefficients and high frequency coefficients. The wavelet transform may then be iterated on the set number of low frequency coefficients until a single low frequency coefficient remains. In some embodiments, this includes a total of 6 iterations (e.g., stages) of the wavelet transform. A reverse set of operations may be undertaken as part of decompression of the compressed image buffer data via a decompressor that includes an entropy decoder and an inverse wavelet transform.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to electronic displays, which may be used to present visual representations of information, for example, as one or more images. Redundant (e.g., non-changing) image frames may provide an opportunity to reduce power consumption and/or reduce processing of an image frame to be displayed on a display. For example, compression of image frames during times when there has been an idle screen (e.g., non-changing image frames) may be provided. However, to insure that the power saving and/or processing saving advantages of the compression, as well as benefits related to reduced space requirements for storage of the compressed image frames, do not come with a loss of image quality, it may be advantageous to implement lossless compression techniques to the compression of the image frame. The techniques outlined herein have the advantage of being lossless (thus, maintaining the same level of visual accuracy as if non-compressed image frames were used as a source image), while also eliminating the use of line buffers that are typically utilized to implement lossless compression (e.g., thereby reducing the overall footprint and size of the display pipeline).

Figure 1:
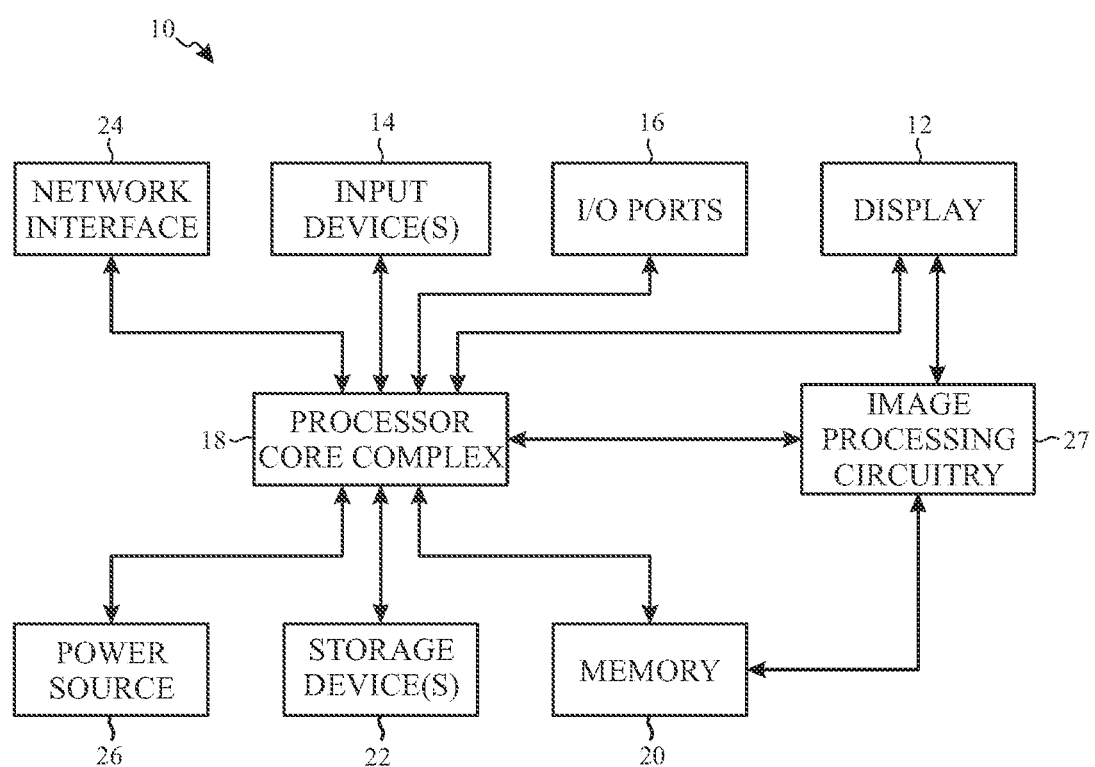
FIG. 1 is a block diagram of an electronic device used to display image frames, in accordance with an embodiment.

To help illustrate, an electronic device 10 that utilizes an electronic display 12 is described in FIG. 1. As will be described in more detail below, the electronic device 10 may be any suitable electronic device, such as a handheld electronic device, a tablet electronic device, a notebook computer, and the like. Thus, it should be noted that FIG. 1 is merely one example of a particular implementation and is intended to illustrate the types of components that may be present in the electronic device 10.

In the depicted embodiment, the electronic device 10 includes the electronic display 12, input devices 14, input/output (I/O) ports 16, a processor core complex 18 having one or more processor(s) or processor cores, local memory 20, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. Additionally, the image processing circuitry 27 (e.g., a graphics processing unit) may be included in the processor core complex 18.

As depicted, the processor core complex 18 is operably coupled with local memory 20 and the main memory storage device 22. In some embodiments, the local memory 20 and/or the main memory storage device 22 may be tangible, non-transitory, computer-readable media that store instructions executable by the processor core complex 18 and/or data to be processed by the processor core complex 18. For example, the local memory 20 may include random access memory (RAM) and the main memory storage device 22 may include read only memory (ROM), rewritable non-volatile memory such as flash memory, hard drives, optical discs, and the like.

In some embodiments, the processor core complex 18 may execute instruction stored in local memory 20 and/or the main memory storage device 22 to perform operations, such as generating source image data. As such, the processor core complex 18 may include one or more general purpose microprocessors, one or more application specific processors (ASICs), one or more field programmable logic arrays (FPGAs), or any combination thereof.

As depicted, the processor core complex 18 is also operably coupled with the network interface 24. Using the network interface 24, the electronic device 10 may communicatively couple to a network and/or other electronic devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image data to a network and/or receive image data from the network.

Additionally, as depicted, the processor core complex 18 is operably coupled to the power source 26. In some embodiments, the power source 26 may provide electrical power to operate the processor complex core 18 and/or other components in the electronic device 10. Thus, the power source 26 may include any suitable source of energy, such as a rechargeable lithium polymer (Li-poly) battery and/or an alternating current (AC) power converter.

Furthermore, as depicted, the processor core complex 18 is operably coupled with I/O ports 16 and the input devices 14. In some embodiments, the I/O ports 16 may enable the electronic device 10 to interface with various other electronic devices. Additionally, in some embodiments, the input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

In addition to enabling user inputs, the electronic display 12 may facilitate providing visual representations of information by displaying images, for example, in one or more image frames. For example, the electronic display 12 may display a graphical user interface (GUI) of an operating system, an application interface, text, a still image, or video content. To facilitate displaying images, the electronic display 12 may include a display panel with one or more display pixels. Additionally, each display pixel may include one or more sub-pixels, which each control luminance of one color component (e.g., red, blue, or green).

As described above, the electronic display 12 may display an image by controlling luminance of the sub-pixels based at least in part on corresponding image data (e.g., image pixel image data and/or display pixel image data). In some embodiments, the image data may be received from another electronic device, for example, via the network interface 24 and/or the I/O ports 16. Additionally or alternatively, the image data may be generated by the processor core complex 18 and/or the image processing circuitry 27.

Figure 2:
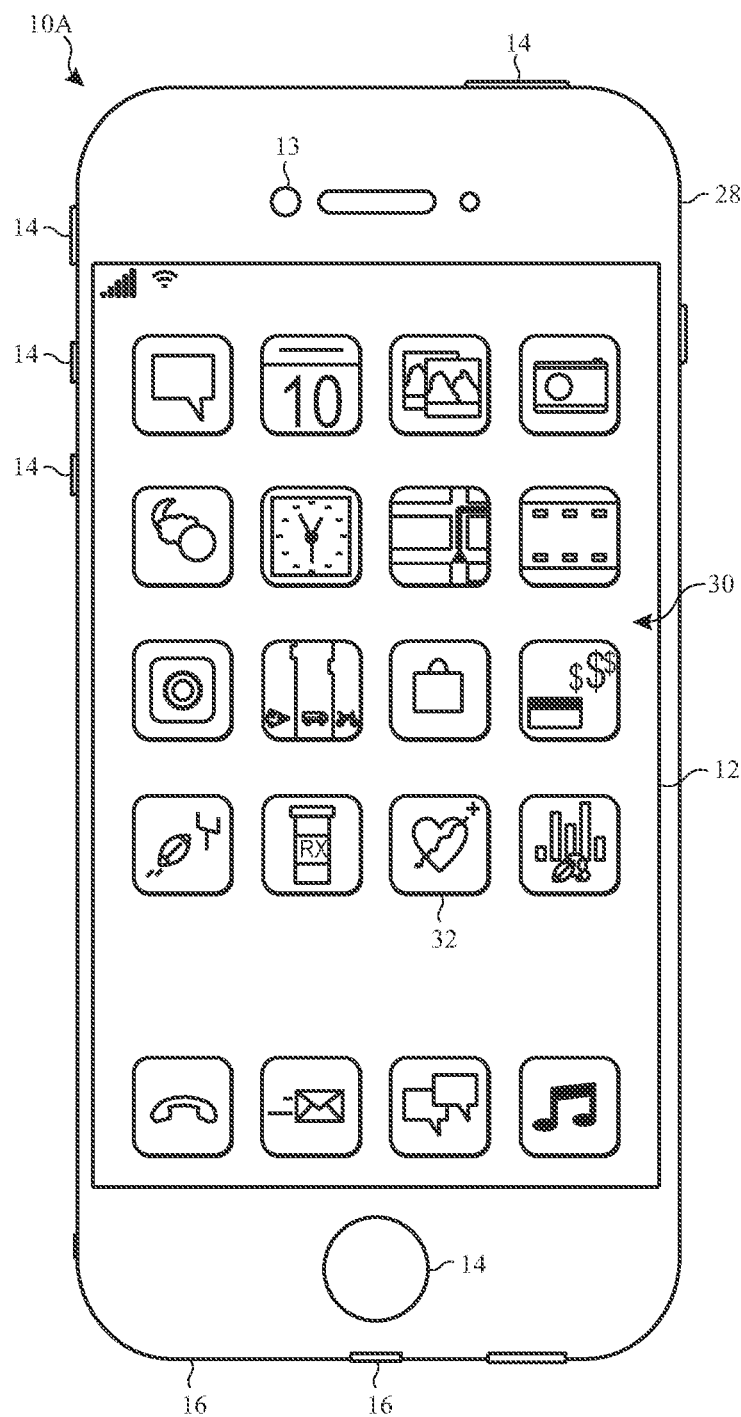
FIG. 2 is an example of the electronic device of FIG. 1, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 24 also open through the enclosure 28. In some embodiments, the I/O ports 24 may include, for example, an audio jack to connect to external devices.

Figure 3:
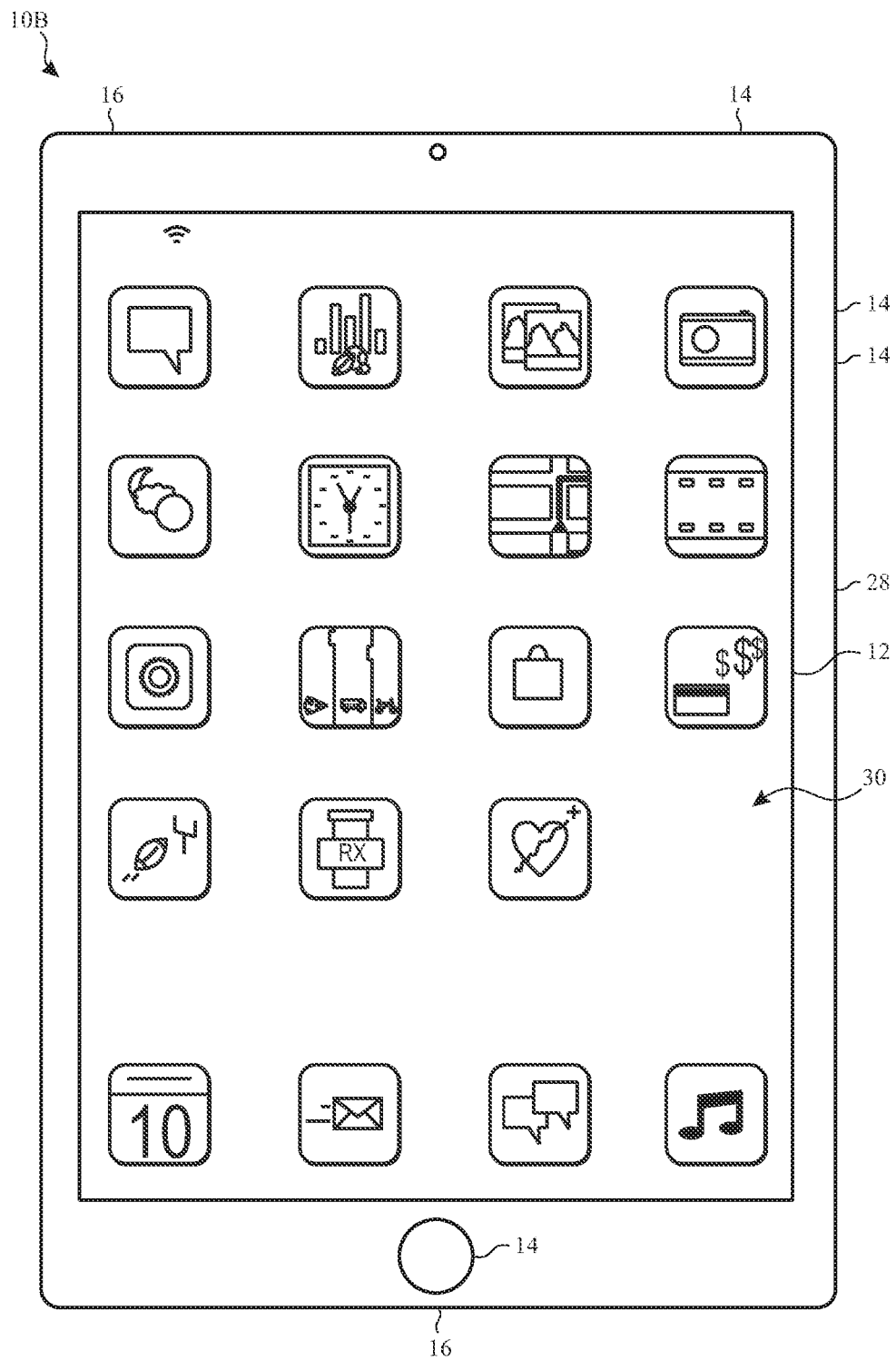
FIG. 3 is an example of the electronic device of FIG. 1, in accordance with an embodiment.
Figure 4:
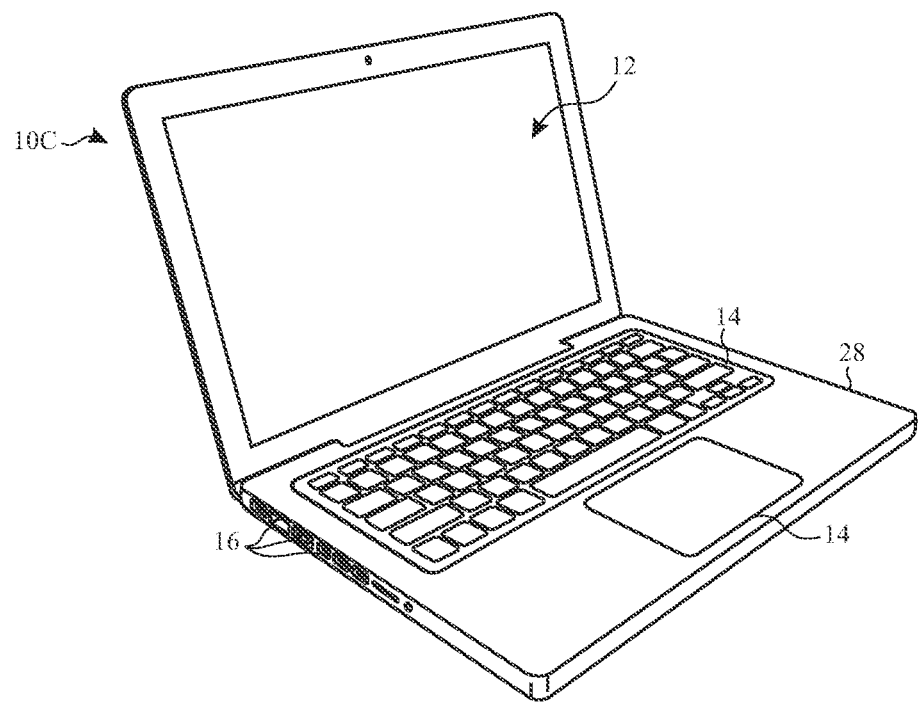
FIG. 4 is an example of the electronic device of FIG. 1, in accordance with an embodiment.
Figure 5:
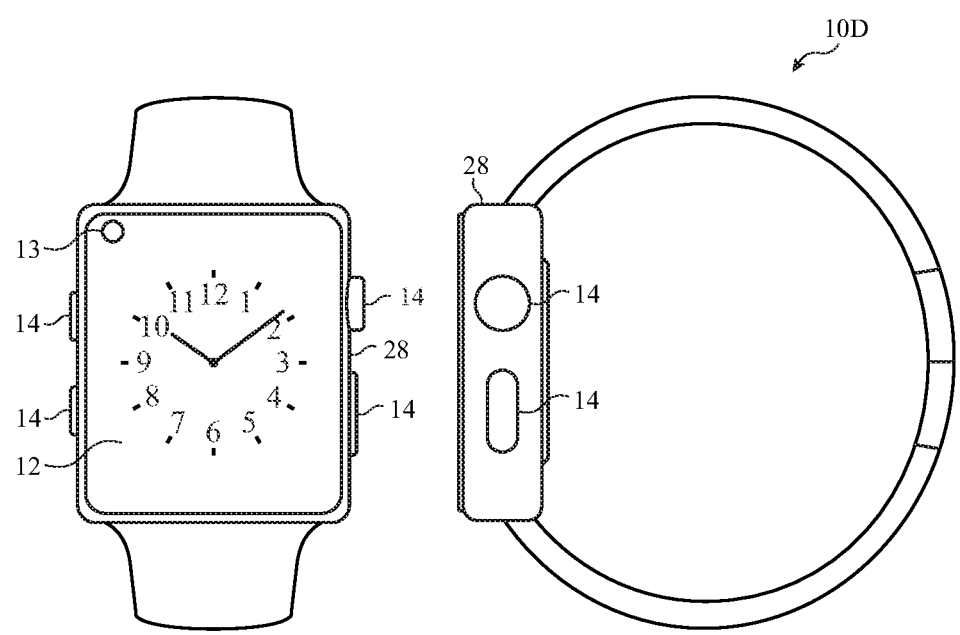
FIG. 5 is an example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, the electronic display 12 may display images based at least in part on image data received, for example, from the processor core complex 18 and/or the image processing circuitry 27. Additionally, as described above, the image data may be processed before being used to display an image. In some embodiments, a display pipe may process the image data, for example, to convert from a source format into a display format. As will be described in more detail below, converting to the display format may include selective processing of compressed and un-compressed data, based on one or more monitored conditions of the display 12 and/or the images being displayed on the display 12.

Figure 6:
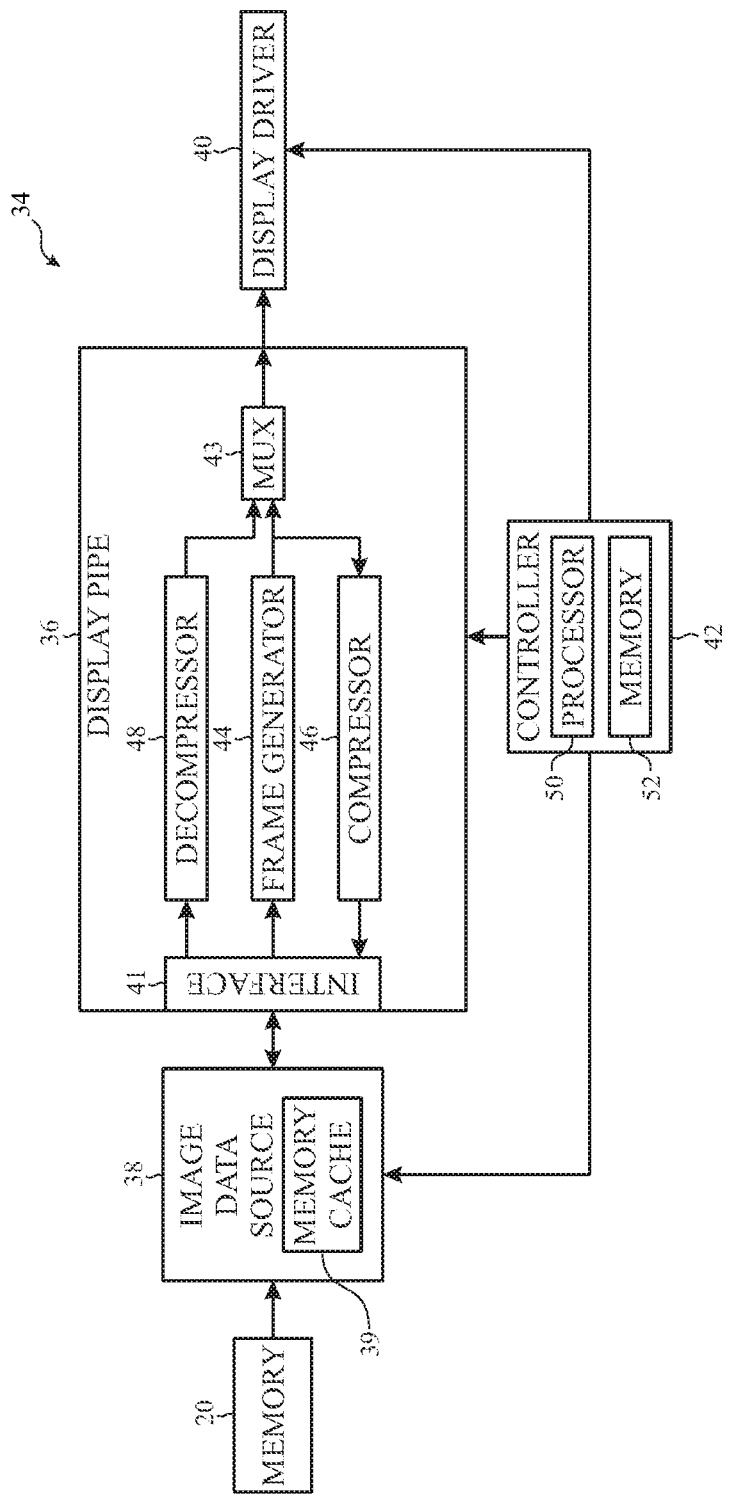
FIG. 6 is a block diagram of a display pipe in the electronic device of FIG. 1, in accordance with an embodiment.

To help illustrate, a portion 34 of the electronic device 10 including a display pipeline 36 (also referred to interchangeably as "display pipe") is described in FIG. 6. In some embodiments, the display pipe 36 may be implemented by circuitry in the electronic device 10, circuitry in the electronic display 12, or a combination thereof. For example, the display pipe 36 may be included in the processor core complex 18, the image processing circuitry 27, a timing controller (TCON) in the electronic display 12, or any combination thereof.

As depicted, the portion 34 of the electronic device 10 also includes an image data source 38, a display driver 40, and a controller 42 and may be disposed, at least in part, in the processor core complex 18 and/or the image processing circuitry 27. In some embodiments, the controller 42 may control operation of the display pipe 36, the image data source 38, and/or the display driver 40. To facilitate controlling operation, the controller 42 may include a controller processor 50 and controller memory 52. In some embodiments, the controller processor 50 may execute instructions stored in the controller memory 52. Thus, in some embodiments, the controller processor 50 may be included in the processor core complex 18, the image processing circuitry 27, a timing controller in the electronic display 12, a separate processing module, or any combination thereof. Additionally, in some embodiments, the controller memory 52 may be included in the local memory 20, the main memory storage device 22, a separate tangible, non-transitory, computer readable medium, or any combination thereof.

In the depicted embodiment, the display pipe 36 is communicatively coupled to an image data source 38. In some embodiments, the image data source 38 may be, for example, a memory controller inclusive of a memory cache 39. In some embodiments, the image data source 38 may be included in the processor core complex 18, the image processing circuitry 27, or a combination thereof. The memory cache 39 may store data that has been received by the image data source 38 so that the image data source 38 may utilize the data stored therein instead of accessing data, for example, from memory 20 and/or memory 52. This may reduce power consumption and/or increase the speed of responses to access of the data stored in the memory cache 39.

The image data source 38 may be coupled to memory 20, which may include one or more source image buffers. The image data source 38 may be able to receive the data from the one or more source image buffers and transmit the received data to the display pipe 36 for generation of an image frame to be displayed on the display 12 via display driver 40. When an image being displayed on the display 12 is changing, the image frame that is generated may not be saved. However, if successive image frames are determined to be unchanged (e.g., via processor 50), compression of the image frame may be undertaken and the compressed image frame may be written back from the display pipe 36 to the image data source 38 (e.g., for storage therein in the memory cache 39 and/or for transmission to, for example, memory 20 and/or memory 52).

In some embodiments, storing the compressed image frame in a compressed image buffer in the memory cache 39 (or, for example, in memory 20 or memory 52) allows for a second source of data to be used to generate an image frame for display on the display 12. The compressed image frame may also, for example, only include a portion of a generated image that is constant such that image data that is constant over multiple frames may be sourced from the compressed image buffer while changing portions of the generated image over multiple frames may be sourced from an image buffer in, for example, cache memory 39, memory 20, and/or memory 52.

When generated images are determined to be changing, (or when generation of successive unchanged images is not detected, for example, by the controller 42), the display pipe 38 may receive image data from one or more image buffers in the memory 20, memory 52, and/or memory cache 39 via an interface 41 and generate an output frame based on the received image data. The display pipe 38 may generate the output frame (e.g., image frame) based upon data stored in a particular image buffer or based upon data stored across more than one image buffer. The received image data may be processed by a frame generator 44 of the display pipe 36, which may include one or more blocks to perform manipulation (e.g., compositing) of the data, conversion of the data from source data to display data, a sub-pixel layout resampler (SPLR), a gain block, an ambient adaptive pixel (AAP) block, a dynamic pixel backlight (DPB) block, a white point correction (WPC) block, a sub-pixel layout compensation (SPLC) block, a burn-in compensation (BIC) block, a panel response correction (PRC) block, a dithering block, a sub-pixel uniformity compensation (SPUC) block, a content frame dependent duration (CDFD) block, an ambient light sensing (ALS) block, or any combination thereof.

After processing, the display pipe 36 may output processed image data, such as display pixel image data, to the display driver 40 via a multiplexer 43. Based at least in part on the processed image data, the display driver 40 may apply analog electrical signals to the display pixels of the display 12 to display images as a generated image frame. In this manner, the display pipe 36 may operate to facilitate providing visual representations of information on the electronic display 12.

The aforementioned process may continue as the image frames are changing. However, the display pipe 36 and/or the controller 42 may monitor the generated image frames for changes in content (e.g., to determine if the content of successive frames is static). Identification of static content in generated frames may correspond to two, three, four, five, etc. successive frames in which the content of the frames does not change. When it is determined that generated frames are static (e.g., a threshold number of successive frames has been generated), a generated frame may, in addition to being sent to the display driver 40 via multiplexer 43, be transmitted to compressor 46. The compressor 46 may operate to compress the generated frame and write back the compressed frame to a compressed image buffer (e.g., located in memory cache 39, memory 20, and/or memory 52) via, for example, the interface 41.

The compressed image buffer may be read from as long as static image conditions exist (e.g., until data at one or more image buffers is detected as being changed, until one or more source addresses used to identify the one or more image buffers is detected as being changed, or the like is detected). The compressed image buffer may be transmitted to the display pipe 36 during the static condition as source data and may be decompressed by decompressor 48, which may operate to perform an opposite set of steps as those performed in the compressor 46 on the received compressed image buffer data to generate an image frame for transmission to the display driver 40 via multiplexer 43 (which, for example, may be controlled in conjunction with the monitoring of the static condition of images to be rendered). Use of the compressor 46 and the decompressor 48 as described above may allow for portions of the display pipe 36 (e.g., the frame generator 44) to be shut off and/or placed in a low power consumption state (e.g., sleep mode) while static image conditions exist to reduce power consumption and/or processing overhead of the device 10.

Figure 7:
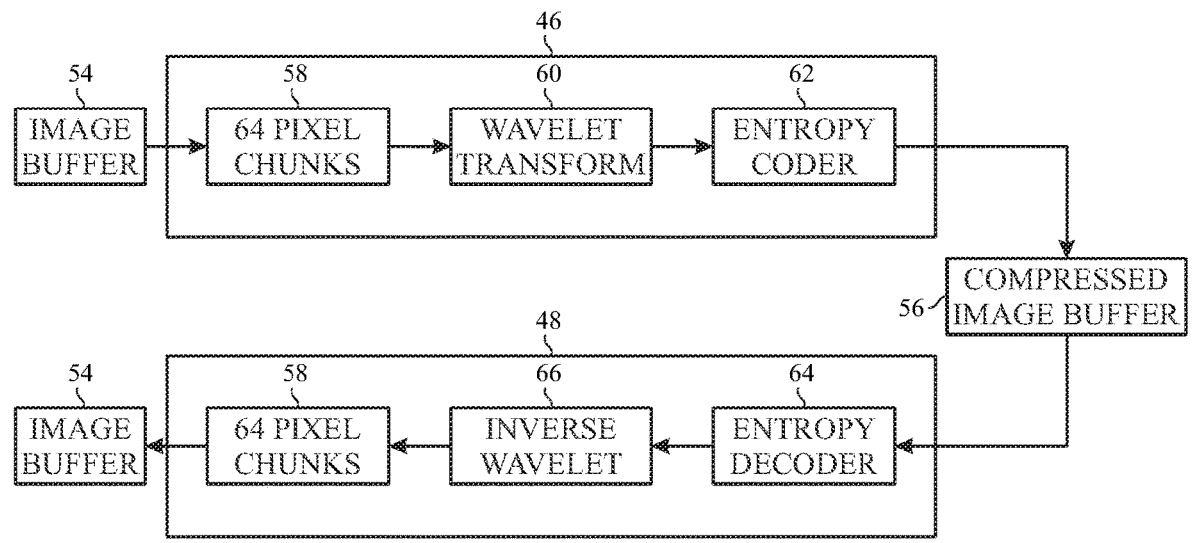
FIG. 7 is a block diagram of a compressor and a decompressor of the display pipe of FIG. 6. in accordance with an embodiment.

In some embodiments, the compression of the generated frame may be undertaken in such a manner that the compression is lossless. FIG. 7 illustrates an example of the compressor 46 and the decompressor 48 that may be used to generate lossless compression and lossless decompression in generation of an image that is transmitted to display driver 40. As illustrated, the compressor 46 may be coupled to image buffer 54, which may represent an image buffer 54 read into the display pipe 36 via interface 41 from one of, for example, memory cache 39, memory 20, or memory 52. Not illustrated for simplicity is the frame generator 44 or any of the processing therein; however, it may be appreciated that the compressor 46 may operate on image data received from the image buffer 54 and processed by the frame generator 44. Once it is determined, as described above, that the image to be displayed on the display 12 is a static image, compression of the image data received by the data pipe 36 and processed by the frame generator may occur via the compressor 46 to generate a compressed image to be stored in the compressed image buffer 56 (e.g., located in memory cache 39, memory 20, or memory 52 and supplied as an alternate image source for the display pipe 36 when, for example, static images are detected.

Likewise, a decompressor 48 is illustrated in FIG. 7. In some embodiments, the compressor 46 and the decompressor 48 are each a portion of an image memory compressor (IMC). The purpose of the IMC is to losslessly compress the image data from an image buffer 54 (e.g., after processing by the frame generator 44 or received in parallel with the image data to be processed by the frame generator 44), which also has the advantage of reduction in the memory footprint of the system and/or reduction in the memory bandwidth of the system utilized. As previously noted, the IMC may operate to losslessly compress (e.g., via the compressor 46) image data, while the decompressor 48 is used to losslessly decompress data retrieved and/or received from compressed image buffer(s). To compress the image, division of the image into image portions 58 of predetermined sizes (e.g., 64-pixel sets) is performed by the compressor 46. Each image portion 58 is sent through a wavelet transform 60 followed by an entropy coder 62. The decompressor 48 consists of an entropy decoder 64 followed by an inverse wavelet transform 66 that perform the reverse set of operations of the compressor 46.

The compressor 46 may operate to losslessly compress the data from an image buffer as efficiently as possible. To accomplish this task, an image buffer data may be first divided into image portions 58 and each image portion 58 is then sent through a wavelet transform 60 (e.g., a perfect-reconstruction filter-bank). The purpose of the wavelet transform 60 is to de-correlate pixels within the respective image portion 58 being compressed. The coefficients that result from the wavelet transform 60 are then passed through an entropy coder 62, which performs the actual compression of the data.

Generally, a signal may be passed through a wavelet transform (e.g., wavelet transform 60) to decompose the signal into different frequency bands, in addition to de-correlating the signal. A signal that has been passed through a wavelet transform (e.g., wavelet transform 60) may be perfectly recovered by passing it through an inverse wavelet transform (e.g., inverse wavelet transform 66). This may be applied to the image portions 58 described above.

Additionally, wavelet transforms (e.g., wavelet transform 60) may rely on multiplications and additions with floating-point coefficients. A particular incarnation of wavelet transforms (e.g., lifting) allow for an integer implementation. The wavelet transform that may be used as wavelet transform 60 for lossless compression can be a lifting implementation with Haar coefficients. Haar wavelet transforms may be used in one embodiment, but other wavelet transforms may be used in other embodiments. Other wavelet transforms that may be used include but are not limited to a 5/3 biorthogonal wavelet (e.g., a biorthogonal Cohen-Daubechies-Feauveau (CDF) 5/3 wavelet) transform, a 9/7 biorthogonal wavelet (e.g., a biorthogonal CDF 9/7 wavelet or a 9/7 bi-orthogonal Daubechies wavelet) transform, or the like. An example of a specific transformation and inverse transformation undertaken by the wavelet transform 60 (e.g., wavelet analysis) and the inverse transform 66 (e.g., wavelet synthesis) is illustrated in FIG. 8.

Figure 8:
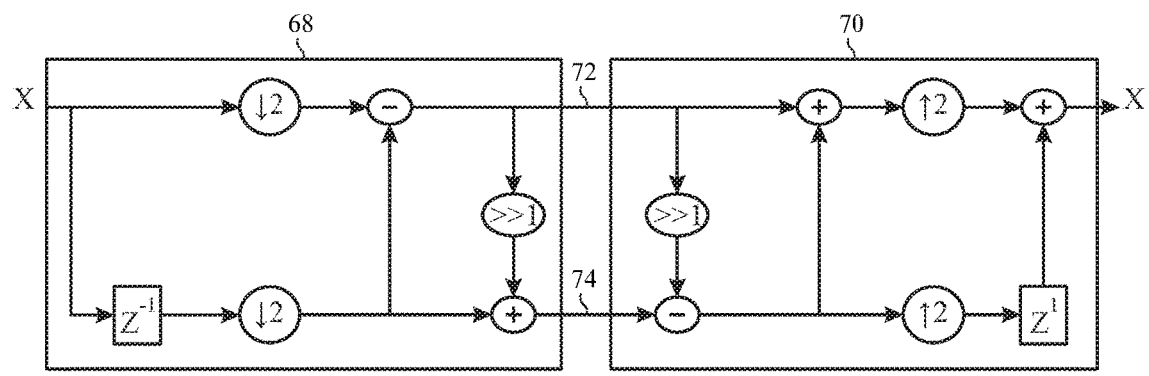
FIG. 8 is a block diagram of a wavelet transform and an inverse wavelet transform of the compressor and decompressor of FIG. 7, in accordance with an embodiment.

The operation of the wavelet transform 60 (e.g., wavelet analysis) may be illustrated by the wavelet analysis 68 of FIG. 8. Likewise, the operation of the inverse wavelet transform 66 (e.g., wavelet synthesis) may be illustrated by the wavelet synthesis 70 of FIG. 8. The wavelet analysis 68 may include, for example, dividing the input (e.g., image portion 58) into even and odd pixels, subtracting the odd pixels from the even pixels, and adding half of the difference back to the odd pixels. The coefficients that result from subtracting the odd pixels from the even pixels are known as high-frequency coefficients, and are illustrated as being output via path 72. The coefficients that result from adding half of the difference back to the odd pixels are known as low-frequency coefficients, and are illustrated as being output via path 74. In some embodiments, the step of shifting right by 1 in the wavelet analysis 68 will round towards 0 for positive numbers and will round towards negative infinity for negative numbers.

One iteration of the wavelet analysis 68 of the wavelet transform 60 on an image portion 58 will lead to a set of low frequency coefficients and a set of high frequency coefficients that proportionally corresponds to the size of the image portion 58 (e.g., each inclusive of one half of the pixels in the image portion 58). For example, when the image portion 58 corresponds to a 64-pixel set, 32 high frequency coefficients and 32 low frequency coefficients are generated. The wavelet transform 60 may then be iterated on the previously generated low frequency coefficients until a single low frequency coefficient remains (e.g., the wavelet analysis 68 may be applied on the low frequency coefficients as the input value "x" iteratively until only one low frequency coefficient remains). For example, this iterative process would include a total of six iterations/stages of the wavelet transform 60 for the 64-pixel image set as the image portion 58. This iterative process may represent a wavelet decomposition and an illustration of the specific six stage wavelet decomposition of a 64-pixel image set as the image portion 58 is set forth in FIG. 9.

Figure 9:
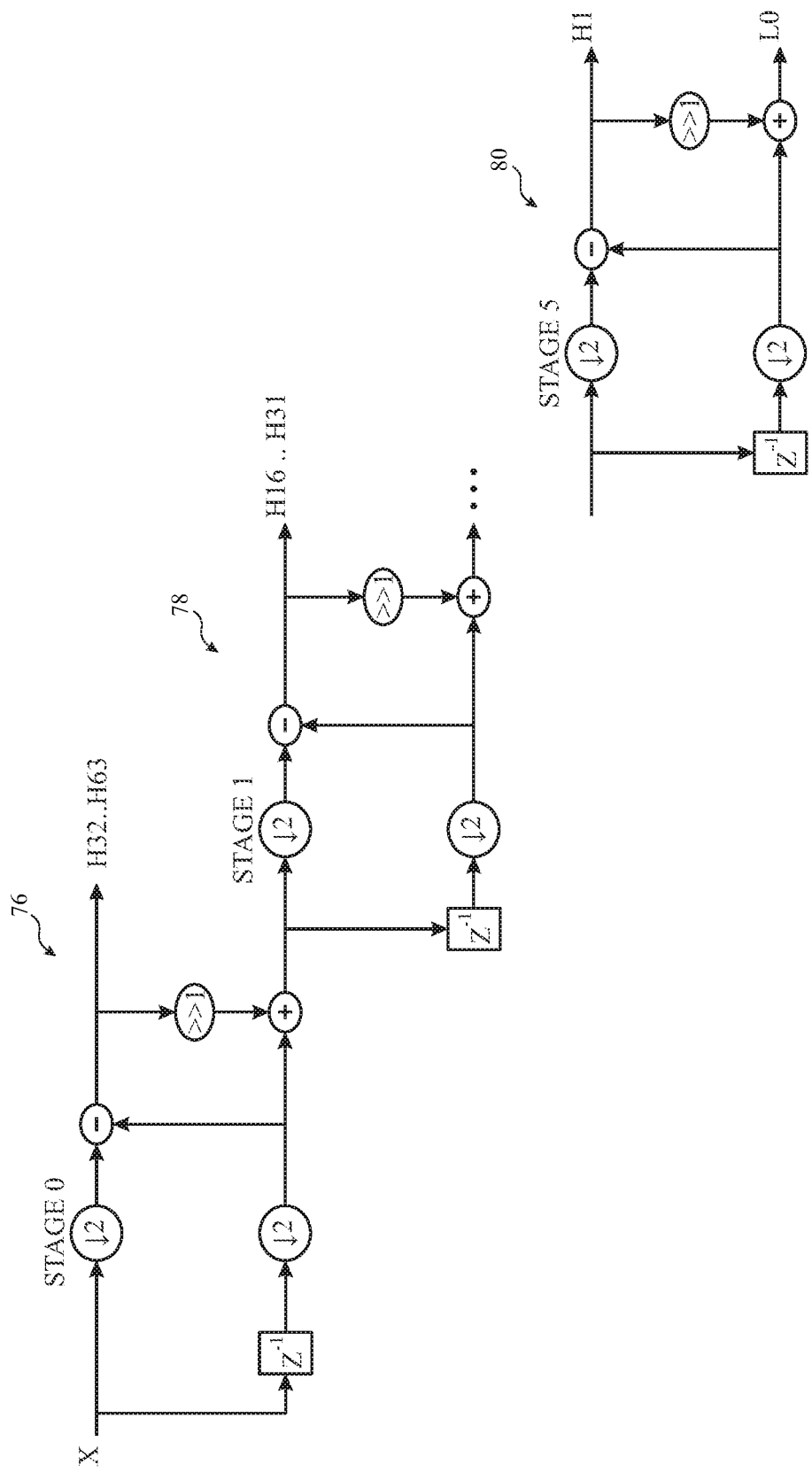
FIG. 9 is a flow diagram of a process for wavelet decomposition using the wavelet transform of FIG. 8, in accordance with an embodiment.

As illustrated in FIG. 9, in stage zero 76 of the wavelet decomposition, the high frequency coefficients are numbered as coefficients as 32 through 63. Similarly, after the low frequency output from the stage zero 76 wavelet decomposition is further decomposed into low and high frequency coefficients, (in stage one 78 of the wavelet decomposition), the resulting high frequency coefficients are numbered 16 through 31. This process may iteratively continue until stage five 80 of the wavelet decomposition, whereby only one high frequency and one low frequency output $L_o$ remain (e.g., until a single low frequency coefficient $L_o$ remains). It is noted that the illustrated and described numbering is for notational convenience and is ordered in terms of the nodes within a tree structure, where $L_o$ is the root of the tree. A functional diagram of the wavelet decomposition described above is additionally presented in FIG. 10.

Figure 10:
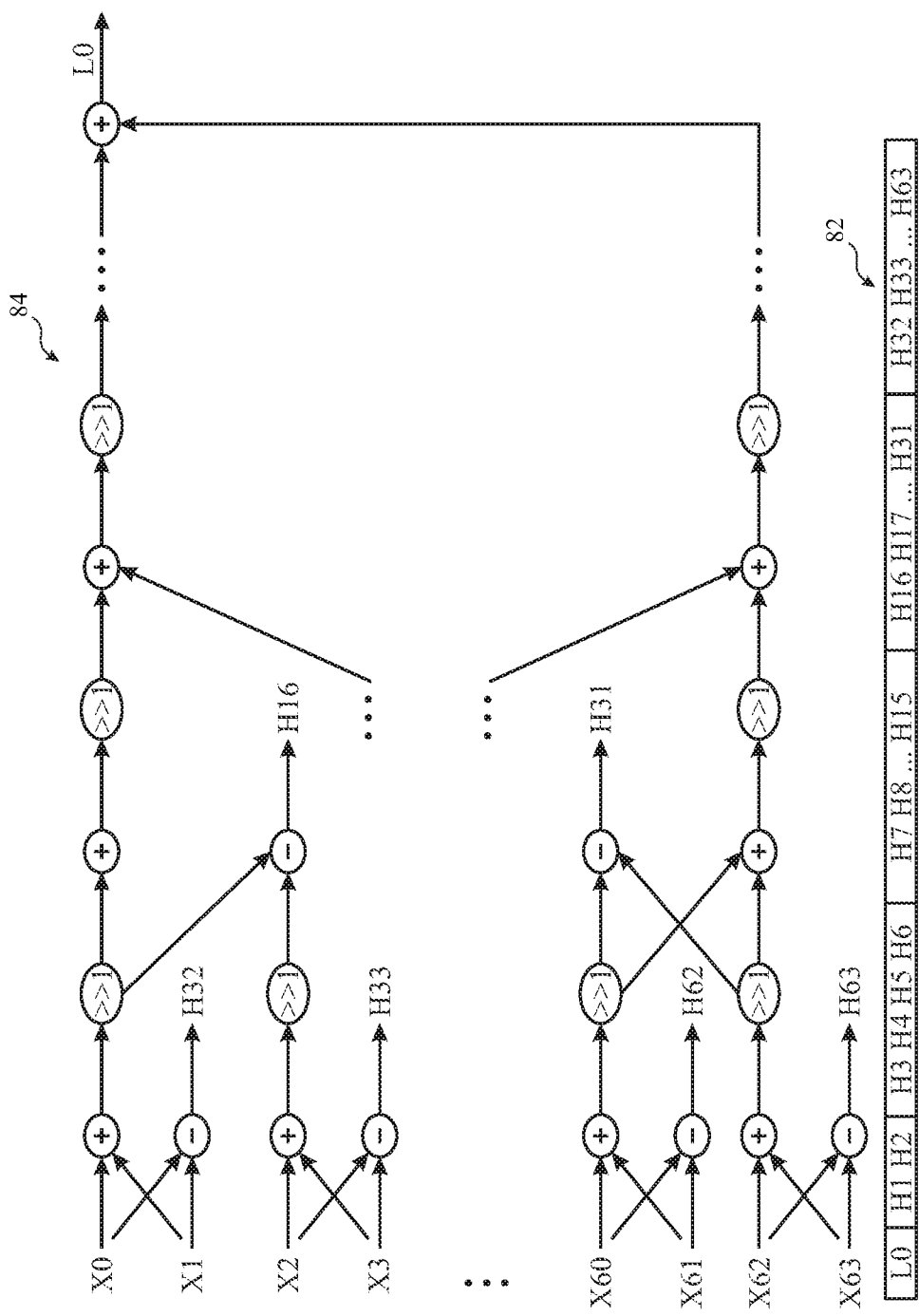
FIG. 10 is a functional diagram of the process of FIG. 9 for wavelet decomposition using the wavelet transform of FIG. 8, in accordance with an embodiment.

As illustrated in FIG. 10, each of the decomposed coefficients 82 (e.g., starting with $L_o$ and ending with h63) can be viewed as a root of a sub-tree. In some embodiments, the single low frequency coefficient $L_o$ may represent an average of the whole block of coefficients. Additionally, the leaves and sub-nodes of each sub-tree may be found through the iterative processes described above (e.g., visually in FIG. 10 by going from right to left in the diagram 84). Each leaf and sub-node in a sub-tree contributes to the computation of the node of the sub-tree, illustrated in FIG. 10 as the averaging of input values (e.g., X0 with X1, X2 with X3, etc.). As a result, if a node of a sub-tree is 0, then there exists a strong likelihood that the sub-nodes and leaves of the sub-tree are also 0. As an example, all 64 coefficients are used to calculate $L_o$ and therefore $L_o$ is the root node of the sub-tree that spans all 64 coefficients. If $L_o$ is equal to 0, then there is a likelihood (e.g., a large probability) that all 64 coefficients are 0. In some embodiments, the compressor 46 may evaluate when one or more of the coefficients (e.g., $L_o$) is zero and refrain from parsing the remainder of the tree.

The decompressed coefficient $L_o$ will, in general, have a relatively large magnitude. To decrease the magnitude of the low frequency coefficient $L_o$, the evaluation for one or more zero values described above may be performed by the compressor 46 as a decompressed coefficient (DC) prediction. The DC prediction may be performed across blocks. In some embodiments, a DC predictor value used therewith may either have a set value (e.g., 128), it may come from the left 64-pixel block, or it may come from the top 64-pixel block of the image being compressed. In some embodiments, the DC predictor value may come from the top 64-pixel predictor block when the 64-pixel block in consideration is the first 64-pixel block in a row of pixels of the image portion 58. Likewise, in some embodiments, the left predictor may be used when the 64-pixel block is not the first block in a pixel row of the image portion 58. Furthermore, in some embodiments, the constant predictor (e.g., the set value of 128 as the middle of the range of 256 values representing colors of the image data or another selected value) may be used for the very first block in the top-left corner of the image buffer 54.

Each time a DC coefficient $L_o$ is encoded, it may be saved. For example, the compressor 46 may write the value of the DC coefficient $L_o$ into a top register as well as a left register, which may be available for use in compression of the block in the next row and the next block to the right, respectively, of the block of the image being compressed. The DC coefficient $L_o$ generates a single syntax element to be coded as dcDiff, which may represent, for example, the difference between the DC coefficient $L_o$ and the dc predictor. An embodiment visually illustrating this technique is illustrated in FIG. 11.

Figure 11:
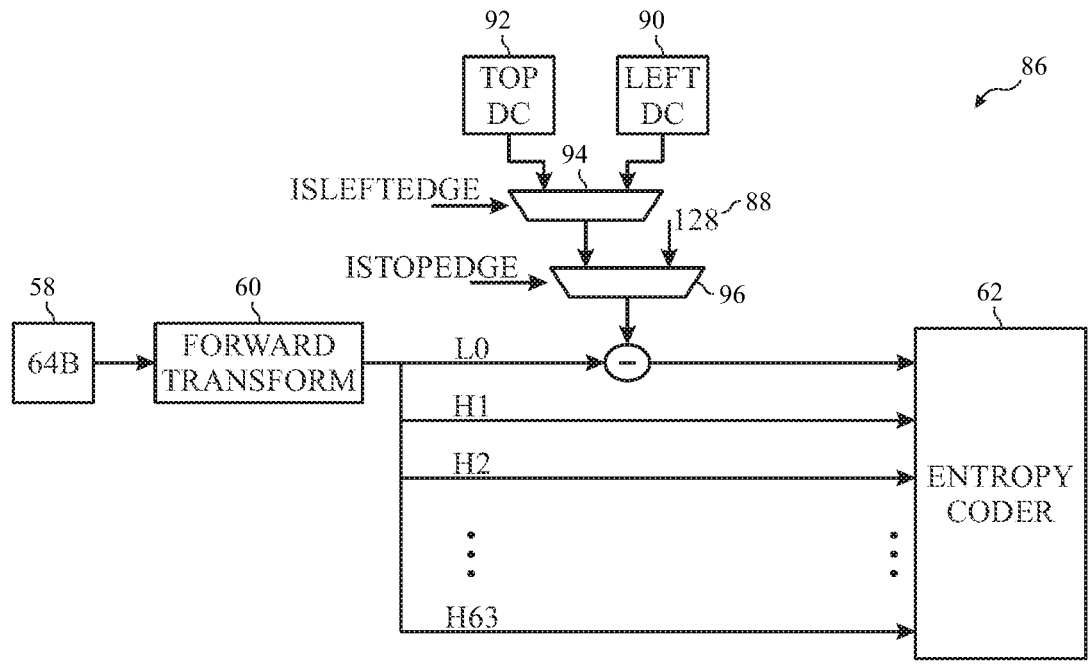
FIG. 11 is a block diagram of syntax elements sent to the entropy coder of FIG. 6, in accordance with an embodiment.

FIG. 11 illustrates a diagram 86 that shows the syntax elements that are to be sent to the entropy coder 62. As illustrated, all high frequency coefficients (h63-h1) are sent directly to the entropy coder 62, while the DC coefficient $L_o$ is modified via subtraction of the DC predictor value therefrom before being sent to the entropy coder 62. As previously discussed, this DC predictor value may have a set value 88 (e.g., 128), it may come from the left 64-pixel block 90, or it may come from the top 64-pixel block 92 of the image being compressed. Additionally, selection of the DC predictor value may be predicated upon the location of the image portion in, for example, the image buffer 54. For example, the DC predictor value may be selected (e.g., via illustrated multiplexor 94 or code emulating the operation of multiplexor 94) from the top 64-pixel block 92 of the image portion 58 being compressed when the 64-pixel block in consideration is the first 64-pixel block in a row of pixels of the image portion 58 being compressed. The DC predictor value may be selected (e.g., via illustrated multiplexor 94 or code emulating the operation of multiplexor 94) from the left 64-pixel block 90 of the image portion 58 being compressed when the 64-pixel block in consideration is the not the first 64-pixel block in a row of pixels of the image portion 58 being compressed. Similarly, the DC predictor value may be selected (e.g., via illustrated multiplexor 96 or code emulating the operation of multiplexor 96) as the set value 88 (e.g., the constant predictor) when the 64-pixel block of the image portion 58 being compressed is the very first block in the top-left corner of the image buffer 54.

In some situations, the image portions 58 may not have a standard width. For example, as mentioned above, each line of an image buffer 54 may be divided into 64-pixel sets. In general, however, image widths are not necessarily a multiple of 64. In situations in which the image width is not a multiple of 64 (e.g., boundary conditions), the right edge of an image buffer 54 will not contain a full 64 pixels. In this case, a redundant bit (e.g., selected as a set value or as the last value present in the image buffer at the right edge of the data retrieved from the image buffer 54) can be utilized to pad the width of the image portion 58 (e.g., out to the 64-pixel boundary).

In embodiments where the last pixel on a right edge of the image buffer 54 is selected to pad the image portion 58 to, for example, the 64-pixel boundary, a set of high-frequency coefficients does not need to be sent to the entropy coder 62 (as they will always be deterministically 0). The number of high-frequency coefficients that do not need to be sent may be equal to, for example, either the number of padded pixels in the case that the number of padded pixels is odd or one less than the number of padded pixels in the case that the number of padded pixels is even. Thus, through the use of bit reproduction in padding of the image portion 58, computational analysis may be reduced for the respective image portion 58 that is padded.

The entropy coder 62 performs compression on the wavelet coefficients. As previously discussed, the coefficients may be numbered in order of traversal of a binary tree, where the low-pass coefficient, $L_o$, is the root of the tree and the edges of the tree represent the dependencies between coefficients. The entropy coder 62 shall parse the binary tree and encode syntax elements for generation of the compressed image buffer 56. The entropy coder 62 may be, for example, a Huffman or arithmetic coder that utilizes, for example, Golomb or Rice coding (e.g., codes).

In one embodiment, adaptive coding may be applied by the compressor 46 whereby an "n" number of codes may be available for use by the entropy coder 62. For example, the compressor 46 may select which of the "n" number of codes will provide an improved encoded image and select that respective code. Likewise, each of the "n" number of codes may be applied to the coefficients to be encoded and a compressed image that, for example, corresponds to the least amount of space required to store the image (e.g., the most efficient code) may be selected and stored in the compressed image buffer 56.

An example of encoding via the entropy coder 62 is described below. Each coefficient that is investigated in the order of 10, h1, h2, . . . , h63 represents a node of a sub-tree. If the whole tree is 0, then it is encoded as a single bit in the case that the coefficient is $L_o$ or it is coded as symbol 0 of an exponential-Golomb code (Exp-Golomb code) in the case that the coefficient is h1, h2 . . . h63. Note that for coefficients h32, h33, . . . , h63, the zero tree symbol and the symbol corresponding to 0 are the same. In other words there are no trees starting at h32 but only leaves of a tree. For the $0^{th}$ coefficient (i.e. $L_o$), a single bit is always coded to indicate the presence/absence of a zero-tree. For $L_o$ and h32, h33, . . . h63, all other coefficients are coded as the absolute value of ($h_i$) or ($L_o$) using Exp-Golomb code along with a single sign bit if absolute value of ($h_i$) or ($L_o$) is larger than 0. For coefficients h1, h2, . . . , h31, the zero-tree symbol is coded as the $0^{th}$ symbol of the Exp-Golomb code and all other coefficients are coded as the absolute value of ($h_i$)+1 of the Exp-Golomb code along with a single sign bit if the absolute value of ($h_i$) is larger than 0. The Exp-Golomb code may be implemented as logic (e.g., hardware elements in the entropy coder 62) or as a look-up table (e.g., accessible via the entropy coder 62 and/or the processor 50).

There is a possibility in some cases that the compressed image buffer 56 will be larger than the original image buffer 54. This may occur when the data in the input image buffer 54 is very noisy. To handle this case, a counter shall be maintained in the data pipe 36 (e.g., in the IMC and/or in conjunction with the operation of controller 42 or the processor 50) that counts the number of compressed bytes. If the number of compressed bytes exceeds the original image buffer 54 size then the original image buffer 54 data will be used and a bit shall be set to indicate that no compression was performed. Additionally, this process of skipping compression may be implemented if, for example, a threshold value is not reached with respect to size reduction of the compressed image buffer 56 with respect to the image buffer 54. For example, if the compressed image buffer 56 utilizes 90%, 80%, 75%, 70%, or another value of the amount of memory used for the image buffer 54, then compression will not be used and the original image buffer 54 data will be used. Additionally, the endian-ness of the encoded bit stream shall be such that the Most Significant Bit (MSB) of the bitstream corresponds to the first bit that is encoded. However, the endian-ness may be selected as desired for particular applications.

Once data is compressed and stored in the compressed image buffer 56, use of this data in conjunction with decompressor 48 may be performed. The decompressor 48 will losslessly recover the signal that was compressed. The decompressor 48 and/or the controller 42 or the processor 50 may check whether the image buffer is compressed (e.g., whether data is present in the compressed image buffer 56 and/or whether a static image condition of the display 12 is occurring). If so, the decompressor 48 may operate in a manner inverse or reverse to the compressor 46 described above. For example, as illustrated in FIG. 7, the decompressor 48 may include an entropy decoder 64 and an inverse wavelet transform 66. A diagram 98 illustrating the operation of the decompressor 48 is provided in FIG. 12.

Figure 12:
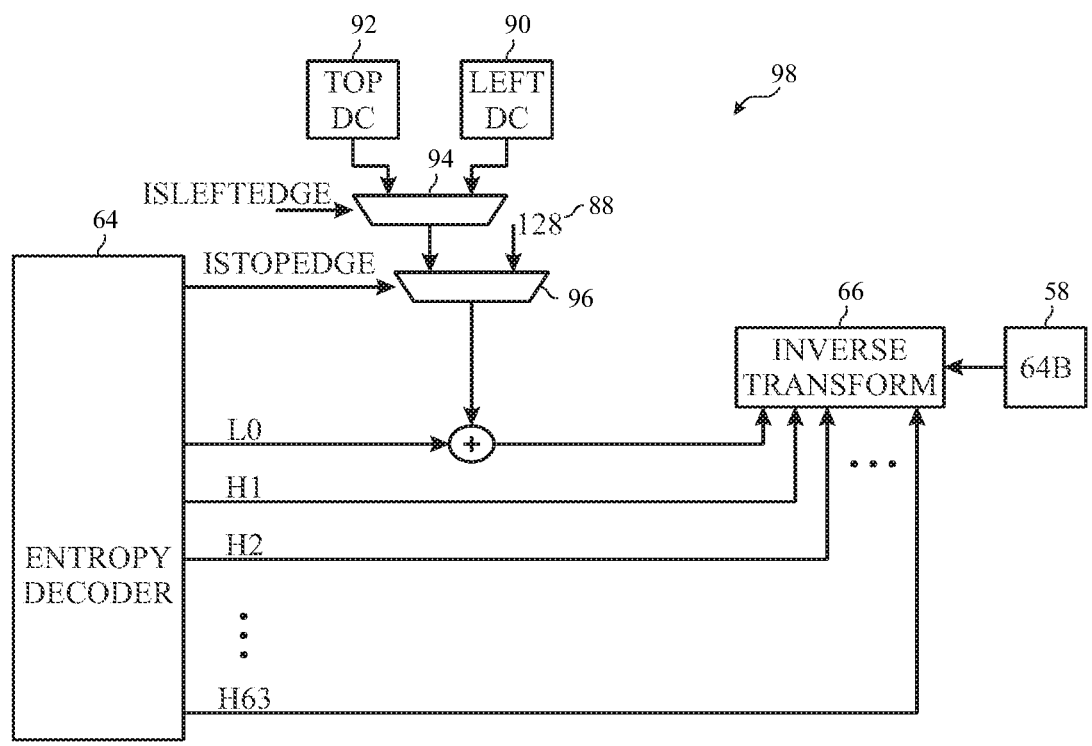
FIG. 12 is a block diagram of syntax elements sent to the entropy decoder of FIG. 6, in accordance with an embodiment.

The entropy decoder 64 illustrated in FIG. 12 may operate to decode the same set of syntax elements that are specified and generated in the entropy coder 62. In one embodiment, for the occurrence of a sign bit and the first bit of a 64-pixel block, a single bit shall be decoded. Thus, the first bit that is decoded that corresponds to a 64-pixel block indicates whether the entire block is a zero-tree. In the remaining circumstances, the Exp-Golomb code (when utilized as set forth above) shall be decoded and the symbol that is decoded shall correspond to the coefficients specified in FIG. 11.

The entropy decoder 64 performs the reverse steps of an entropy coder 62. Accordingly, when utilizing an Exp-Golomb code in the entropy coder 62, a corresponding decoding procedure may be utilized. For example, the entropy decoder 64 may count a number of values of one present in the code word. If no values of one are encountered and the first bit is a zero in the code word, then three more bits may be decoded to represent the value of the symbol. Otherwise "n" ones of the code word may be decoded. Subsequently, the next bit may be decoded, which may be a zero. If that bit is not a zero, then a bitstream error has occurred and, for example, an indication may be transmitted that may cause a switch to the input buffer 54 as the source of data for generation of the image. If, however, the bit is a zero, the entropy decoder 64 may decode (n+3) bits after the zero bit. The decoded symbol (i.e., coefficient value) may be equal to the binary representation of the (n+3) bits. Additionally, the decoded coefficients may be populated into a binary tree in the same order than the coefficients were encoded. Once 64 coefficients are populated, these coefficients can then be fed into the inverse wavelet decomposition.

In FIG. 12, the DC coefficient $L_o$ is constructed by first adding the DC predictor to the decoded dc difference value. The DC predictor is determined by the position of the 64-pixel block within the image, as discussed above with respect to FIG. 11. Each time a DC coefficient $L_o$ is decoded, it may be saved into both the top and left registers to be used by the next block as well as the first block in the next row. When a zero-tree symbol is decoded, the entire sub-tree that is represented by the coefficient location may also be populated with zeros (this will correspond to a set of high frequency coefficients, $h_i$). If a zero-tree coefficient is not decoded and instead a regular coefficient value is decoded it shall be populated into the appropriate position prior to inverse wavelet decomposition.

Figure 13:
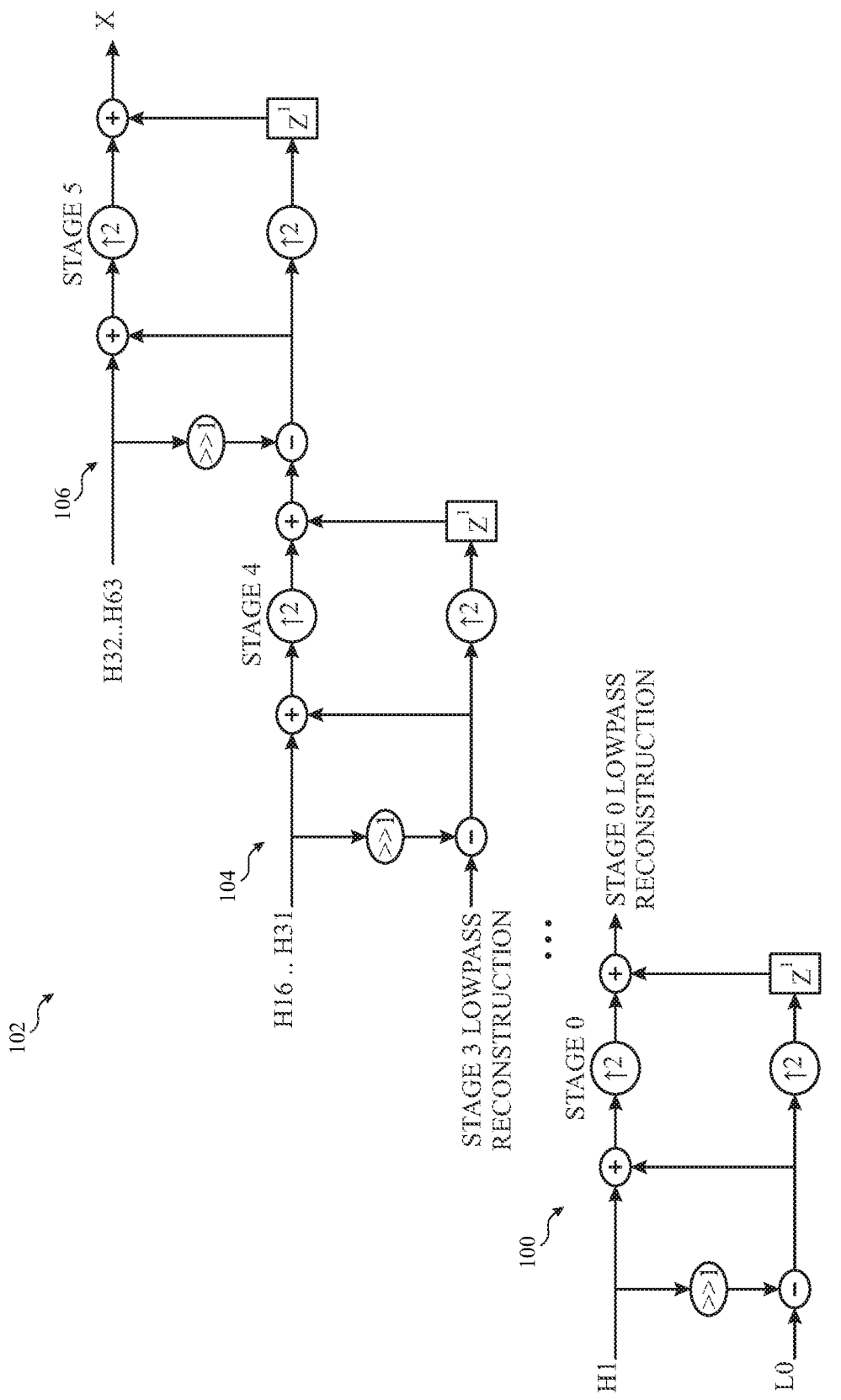
FIG. 13 is a functional diagram of a process for inverse wavelet decomposition using the decompressor of FIG. 7, in accordance with an embodiment.

Returning to FIG. 8, an inverse Haar wavelet transform is depicted as the wavelet synthesis 70 performed in the inverse wavelet 66 of the decompressor 48. The wavelet synthesis 70 (e.g., the inverse wavelet decomposition process) will be the inverse of the wavelet analysis 68 discussed above. For example, as illustrated in FIG. 13, the wavelet synthesis 68 may be an iterative process that include a total of six iterations/stages of the inverse wavelet transform 66 for the 64-pixel image set as the image portion 58. This iterative process may represent a wavelet composition and an illustration of the specific six stage wavelet composition of a 64-pixel image set as the image portion 58 is set forth in FIG. 13.

As illustrated in FIG. 13, in stage zero 100 of the wavelet composition 102, the inputs are a high frequency coefficient h1 and the single low frequency coefficient $L_o$. Stage zero 100 of the wavelet composition 102 may proceed in a manner inverse to the wavelet decomposition, such that by stage four 104 of the wavelet composition 102, coefficients as 16 through 31 and the stage three low pass reconstruction coefficients are received at stage four 104 of the wavelet composition 102. These coefficients are composited to arrive at the original input value of "x" in stage five 106 of the wavelet composition 102 to complete the lossless decompression of the data from the compressed image buffer 56. This data may be transmitted as the image portion 58, for example, for generation of an image on the display 12 (e.g., via multiplexer 43 to the display driver 40). Accordingly, the wavelet composition 102 consists of six stages to reverse the operations shown in FIG. 9. In other words, a wavelet synthesis 70 is first performed on the lowest level of decomposition (stage five 80 of the wavelet decomposition) followed, by the next lowest level (stage four of the wavelet decomposition) all the way until the highest level (stage zero 76 of the wavelet decomposition) is reconstructed.

In the general case, the image portion 58 width will not be a multiple of 64. In this case, the final decoded block will not be a full 64 coefficients. Thus, since the entropy coder 62 replicated the final pixel to a 64-pixel boundary, the high frequency coefficients corresponding to the sub-trees that represent those locations will all be zero. The entropy decoder 64 shall populate these sub-trees with zero as well prior to inverse wavelet decomposition.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display control system, comprising:
   a memory; and
   at least one processor coupled to the memory and configured to:
      detect a first condition related to an image frame comprising image data;
      compress portions of the image frame iteratively to generate a compressed frame when the first condition is detected at least in part by:
         performing a wavelet transform on first image data to determine a high-frequency coefficient and a first low-frequency coefficient;
         determining a predictor of the first low-frequency coefficient, wherein:
            the predictor of the first low-frequency coefficient is a mid-range image data value when the first image data corresponds to a portion of a first image that is processed before other portions of the first image;

the predictor of the first low-frequency coefficient is a second low-frequency coefficient associated with a top neighboring portion of the first image when the portion of the first image corresponding with the first image data is processed before other portions of a row in the first image; and the predictor of the first low-frequency coefficient is a third low-frequency coefficient associated with a left neighboring portion of the first image when the portion of the first image corresponding with the first image data is not processed before the other portions of the row in the first image; and encoding the high-frequency coefficient and a difference between the predictor and the first low-frequency coefficient to generate compressed image data; and determine whether to transmit the compressed frame to the memory.

2. An electronic device, comprising:

an image data source configured to output first image data corresponding with a first image followed by second image data corresponding with a second image, and wherein the first image is a first portion of a first image frame that is less than an entirety of the first image frame and the second image is a second portion of a second image frame that is less than an entirety of the second image frame; and a display pipeline coupled to the image data source, wherein the display pipeline comprises:

image processing circuitry configured to process the first image data to generate first processed image data that facilitates improving perceived image quality when used to display the first image on an electronic display; and a controller coupled to the image processing circuitry, wherein the controller is configured to:

determine whether the second image differs from the first image; and when the second image does not differ from the first image:

instruct the display pipeline to compress the first processed image data into first compressed image data at least in part by:

performing a wavelet transform on the first processed image data to determine a high-frequency coefficient and a first low-frequency coefficient;

determining a predictor of the first low-frequency coefficient, wherein:

the predictor of the first low-frequency coefficient is a mid-range image data value when the first image data corresponds to a portion of the first image that is processed before other portions of the first image;

the predictor of the first low-frequency coefficient is a second low-frequency coefficient associated with a top neighboring portion of the first image when the portion of the first image corresponding with the first image data is processed before other portions of a row in the first image; and the predictor of the first low-frequency coefficient is a third low-frequency coefficient associated with a left neighboring portion of the first image when the portion of the first image corresponding with the first image data is not processed before the other portions of the row in the first image; and entropy encoding the high-frequency coefficient and a difference between the predictor and the first low-frequency coefficient to generate the first compressed image data; and instruct the display pipeline to de-compress the first compressed image data into the first processed image data to enable the electronic display to display the second image using the first processed image data.

3. The electronic device of claim 2, comprising a compressed image buffer coupled to the display pipeline, wherein, when the second image does not differ from the first image, the display pipeline is configured to:

store the first compressed image data in the compressed image buffer; and retrieve the first compressed image data from the compressed image buffer.

4. The electronic device of claim 3, wherein the image data source comprises a source image buffer configured to store the first image data and the second image data.

5. The electronic device of claim 2, wherein:

the image data source is configured to output third image data corresponding with a third image following the second image data corresponding with the second image, wherein the third image is a third portion of a third image frame that is less than an entirety of the third image frame; and the controller is configured to:

determine whether the third image differs from the first image; and instruct the display pipeline to de-compress the first compressed image data into the first processed image data to enable the electronic display to display the third image using of the first image.

6. The electronic device of claim 2, wherein, when the second image differs from the first image, the image processing circuitry implemented in the display pipeline is configured to process the second image data to generate second processed image data that facilitates improving perceived image quality when used to display the second image on the electronic display.

7. The electronic device of claim 6, wherein:

the image data source is configured to output third image data corresponding with a third image following the second image data, wherein the third image is a third portion of a third image frame that is less than an entirety of the third image frame; and the controller is configured to:

determine whether the third image differs from the second image when the second image differs from the first image; and when the third image does not differ from the second image:

instruct the display pipeline to compress the second processed image data into second compressed image data; and instruct the display pipeline to de-compress the second compressed image data into the second processed image data to enable the electronic display to display the third image using the second processed image data.

8. A device, comprising:

a compressor configured to sequentially compress portions of data of an image frame received from an image buffer to generate a compressed image upon a determination that a static condition related to an image displayed on a display has occurred, at least in part by:

performing a wavelet transform on the portions of data to determine a high-frequency coefficient and a first low-frequency coefficient;

determining a predictor of the first low-frequency coefficient, wherein:

the predictor of the first low-frequency coefficient is a mid-range image data value when the portions of data corresponds to a portion of the image that is processed before other portions of the image;

the predictor of the first low-frequency coefficient is a second low-frequency coefficient associated with a top neighboring portion of the image when the portion of the image corresponding with the portions of data are processed before the other portions of a row in the image; and the predictor of the first low-frequency coefficient is a third low-frequency coefficient associated with a left neighboring portion of the image when the portion of the image corresponding with the portions of data are not processed before the other portions of the row in the image; and entropy encoding the high-frequency coefficient and a difference between the predictor and the first low-frequency coefficient to generate the compressed image; and a decompressor configured to receive the compressed image as a data source for generation of the image on the display.

9. The device of claim 8, wherein the wavelet transform is configured to de-correlate data representative of pixels of the display within each portion of data of the portions of data and decompose each portion of data of the portions of data into respective frequency bands.

10. The device of claim 9, wherein the compressor comprises an entropy coder configured to utilize a first code to sequentially compress the portions of data.

11. The device of claim 9, wherein the wavelet transform is configured to perform an iterative wavelet decomposition on each portion of data of the portions of data to generate a respective single low frequency output.

12. The device of claim 11, wherein the compressor is configured to apply a decompressed coefficient (DC) predictor value to the respective single low frequency output to reduce a magnitude of the respective single low frequency output prior to transmission of the respective single low frequency output to an entropy coder of the compressor.

13. The electronic device of claim 2, wherein, to decompress the first compressed image data, the image processing circuitry is configured to:

entropy decode the first compressed image data to determine the high-frequency coefficient and a difference between a low-frequency coefficient and the predictor; and perform an inverse wavelet transform on the high-frequency coefficient and the low-frequency coefficient to determine the first processed image data.

14. The electronic device of claim 2, wherein:

the first portion of the first image data comprises sixty-four pixels; and the second portion of the second image data comprises sixty-four pixels.

15. The electronic device of claim 2, wherein the electronic device comprises a computer, a mobile phone, a portable media device, a tablet, a television, a watch, a virtual-reality headset, or a vehicle dashboard.

16. The device of claim 10, wherein the entropy coder is configured to selectively apply the first code from a set of codes to sequentially compress the portions of data.

17. The device of claim 12, wherein the compressor is configured to:

select the DC predictor value based on which of each portion of data of the portions of data the wavelet transform is performing the iterative wavelet decomposition.

18. The electronic device of claim 2, comprising frame generator, wherein the the frame generator is operated in a lowered power state while a static image conditions exist.

19. The display control system of claim 1, wherein the portions of the image frame represent sets of pixels of a display.

20. The display control system of claim 1, wherein the at least one processor is configured to detect a static condition of a display as the first condition, and wherein the static condition corresponds to a lack of change in the image frame relative to at least one preceding image frame or at least one subsequent image frame.

* * * * *